United States Patent [19]

Chaumont

[11] 4,212,143
[45] Jul. 15, 1980

[54] DEFLECTOR MEANS FOR MOWER-CONDITIONER

[75] Inventor: Gerard P. L. Chaumont, Dijon, France

[73] Assignee: Sperry Corporation, New Holland, Pa.

[21] Appl. No.: 9,977

[22] Filed: Feb. 6, 1979

[30] Foreign Application Priority Data

Feb. 14, 1978 [GB] United Kingdom ............... 5752/78

[51] Int. Cl.² .......................................... A01D 49/00
[52] U.S. Cl. ................................. 56/14.4; 56/DIG. 1
[58] Field of Search ...................... 56/1, DIG. 1, 14.4, 56/13.5, 192

[56] References Cited

U.S. PATENT DOCUMENTS

| | | | |
|---|---|---|---|
| 2,918,774 | 12/1959 | McCarty | 56/1 |
| 3,039,256 | 6/1962 | Witt | 56/1 |
| 3,106,052 | 10/1963 | Ingram | 56/1 |
| 3,383,844 | 5/1968 | Glass et al. | 56/14.4 |
| 3,683,602 | 8/1972 | Scarnato et al. | 56/14.4 |
| 3,754,384 | 8/1973 | Case et al. | 56/14.4 |
| 3,841,070 | 10/1974 | Scarnato et al. | 56/14.4 |

FOREIGN PATENT DOCUMENTS

2231624  1/1974  Fed. Rep. of Germany ............ 56/14.4
1295226 11/1972  United Kingdom ........................ 56/1

*Primary Examiner*—Russell R. Kinsey
*Attorney, Agent, or Firm*—Frank A. Seemar; Larry W. Miller; Ralph D'Alessandro

[57] ABSTRACT

The invention seeks to improve the versatility of mower-conditioners by providing a single machine which can produce a relatively confined windrow of cut crop or a relatively scattered windrow for fast drying of the crop and without the need for a separate tedding operation. In accordance with the invention a mower-conditioner comprises mower means for cutting standing crop, rotary crop conditioner and spreader means located rearwardly of the mower means for operating on the cut crop, fixed deflector means positioned rearwardly of the crop conditioner and spreader means and further deflector means movable between first and second positions relative to the fixed deflector means, the fixed and movable deflector means being operable in one position of the movable deflector means to form a windrow of the crop discharged from the crop conditioner and spreader means and in the other position of the movable deflector means to allow the crop conditioner and spreader means to widely spread the cut crop.

20 Claims, 6 Drawing Figures

DEFLECTOR MEANS FOR MOWER-CONDITIONER

BACKGROUND OF THE INVENTION

1. Field of the Invention

The present invention relates to mower-conditioners which are machines which both cut standing crop and then condition the cut crop before discharging the same to the ground.

In this specification "right-hand," "left-hand," "forward," and "rearward" references are determined by standing at the rear of the machines and facing in the direction of forward operative travel thereof. Also, in the following description it is to be understood that such terms as "forward," "left" and "upwardly" are words of convenience and are not to be construed as limiting terms.

Mower-conditioners according to the invention may comprise a reciprocating cutterbar. However, preferably the mower means will be of the type comprising at least a pair of rotatable cutter units mounted side-by-side and each supporting at least one cutter blade operable to cut the standing crop by impact as opposed to shearing, during forward movement of the mower-conditioner.

The rotatable cutter units may be of the type comprising a disc-like structure supporting at its outer periphery at least one cutter blade and being driven from below by drive means which are arranged inside a housing, the housing extending below the cutter units and in transverse direction over substantially the total width of the machine. However, the rotatable cutter units may also be of the so-called "drum" type comprising top driven drums supporting at their lower ends flanges each of which supports at least one cutter blade at its outer periphery.

2. Description of the Prior Art

Some mower-conditioners currently in use have either a disc-type or a drum-type cutter assembly in combination with a pair of transversely-extending cooperating conditioner rolls. In operation, the standing crop is cut by means of the cutter units and flung rearwardly into the intake nip between the conditioner rolls. The conditioner rolls are rotated in a manner to receive the cut crop at their forwardly facing intake nip and to pull the crop therebetween, thereby "conditioning" it by which is meant squeezing and cracking the stems so as to facilitate the evaporation of the moisture therefrom and hence speed up the drying cycle. Finally, the conditioner rolls eject the treated crop in a rearward direction depositing it in a windrow on the ground surface. In general, the operation of a mower-conditioner of the above type is satisfactory as far as mowing and conditioning are concerned.

However, the windrow formed by such a machine is often a rather thick and dense layer of crop, whereby the lowermost portions of the layer, in spite of the preceding conditioning operation, cannot dry quickly. For better and quicker drying, and thus to reap full benefit from the conditioning operation, the mown and conditioned crop should be further treated with a tedder or the like as soon as possible after the conditioning operation, so as to spread the crop in an even, thin and fluffy layer or windrow. The sun and wind can then easily and advantageously influence the drying speed of the mown crop. Since haymaking is often a "one person" operation, the subsequent treatment of the mown and conditioned crop is normally not started until the entire mowing and conditioning operation has been finished and hence the subsequent treatment is quite often delayed considerably, whereby the benefit of having conditioned the crop is at least partially annulled.

Moreover, it occasionally happens that the transitional movement of the crop from the cutter units to the conditioner rolls is not entirely satisfactory in as far as this movement is sometimes uneven. This ultimately results in the crop passing through the conditioner means in bunches, which again results in poor conditioning. The cause of this is considered to be that of the rolls not being sufficiently aggressive on the crop which is fed thereto.

In another known arrangement, a twin-rotor tedder has been hitched to the rear of a known four-disc rotary mower for spreading the crop immediately after being cut. In this arrangement the tedder extends parallel to the mower means at a considerable distance rearwardly thereof and has substantially the same width as the mower means. The axis of symmetry of both the mower means and the tedder coincide with each other. The tedder comprises a pair of supporting wheels arranged underneath respective rotor units, the latter each comprising four radially-outwardly projecting arms with generally upright tines at their outer ends. The lower ends of the tines, when in their forward position, extend to a location below and rearwardly of the rear edge of the associated mower means. The tedder units are rotated in opposite directions so as to have the tines moving towards each other at their forward ends.

In operation, the two machines are moved over the field, one behind the other. The standing crop is cut by the cutter units of the mower and is discharged thereby in a rearward direction at locations generally above and rearwardly of the areas between respective pairs of mower units. This means that the crop is discharged in two portions positioned generally forwardly of the rotary axis of the respective tedder rotors. This also means that, at the moment the tines contact the crop, the tines are moving in a direction generally transverse to the forward movement of the machine and hence generally perpendicular to the direction of movement of the crop being discharged from the mower cutter units. This, together with the fact that the tines extend in a generally upward direction, i.e. also generally perpendicular to the rearward direction of movement of the cut crop, results to some extent in the cut crop being thrown rearwardly between the tedder units in bunches rather than being evenly spread. The foregoing also results in a rather poor conditioning operation by the tedder, if any at all, as it is difficult for the tines to crack the crop stems when the crop is conveyed in bunches through the tedder means.

Also the relatively large distance between the mower means and the tedder may adversely influence the fluent transition of the crop from one to the other and hence also the spreading action of the tedder is adversely influenced. Moreover, because the equipment is merely two individual machines being towed one behind the other, the relative position of the two machines varies continuously due to ground irregularities. This again may adversely influence the transition of the crop from the mower means to the tedder.

Furthermore, the tines may occasionally touch the ground at the forward end of the tedder whereby soil may be mixed with the crop, on the one hand, and the tines may be submitted to heavy loads which may cause damage thereto, on the other hand.

Also because of the generally parallel relationship between the mower and tedder, normally the mown crop is spread (be it unevenly) over at least the full width of the mower. In other words, no strip of ground is left clear of mown crop for the right-hand tractor wheels to run therealong during the next run. Thus, after having spread the crop in a generally fluffy manner, a portion thereof will very soon be compressed again by the tractor wheels during the next run. More importantly, a considerable amount of cut crop is thrown on the still standing crop, which has to be cut during the next run. This is of course undesirable. Moreover, this occasionally may interfere with the proper cutting action of the machine during the next run.

In still another arrangement, rotary mower means, which are inclined relative to the transverse direction, have been combined with a single-rotor tedder extending horizontally and transversely. The tedder comprises a single transverse and horizontal shaft with a plurality of tines thereon and is arranged to rotate in such a manner as to operate on the cut crop either by a back-kicking action or an up-and-over action. The tedder is positioned at a considerable distance behind the mower means, whereby during operation, mown crop is first discharged onto the ground surface before being treated by the tedder. This has proven to be a considerable disadvantage for several reasons because the tedder has to lift mown crop from the ground, it may sometimes miss some of the crop and at other times may mix soil with the crop. Also, a tedder of this type has only a very minor conditioning action, if any at all. Furthermore, the spreading action, if any at all, is less than satisfactory.

In any event, some mower-conditioners known so far and which are generally satisfactory as far as mowing and conditioning are concerned, have no spreading action at all. Other machines with a certain spreading action are not adapted properly to condition the crop.

A mower-conditioner comprising rotary crop conditioner and spreader means mounted behind the mower means has been disclosed in U.S. Pat. No. 4,094,132. This combination is generally satisfactory as far as mowing, conditioning and spreading is concerned and, therefore, the machine disclosed in U.S. Pat. No. 4,094,132 is a very useful agricultural tool in many circumstances.

However, while the foregoing combination of three separate functions is very desirable for haymaking, there are certain circumstances when spreading is not desired. The foregoing machine therefore could not be used in such circumstances, unless special steps are taken. One such circumstance is when one wants to use the mower-conditioner for cutting grass prior to making silage. Grass is often merely cut and formed into a windrow where it stays about two days. Thereafter, the wilted grass is picked-up from the ground with the pick-up means of a forage harvester and chopped into silage.

The use of deflectors in mower-conditioners is already generally known in the art. However, all deflectors known until now are for further consolidating the windrow formed by the conditioning means. In one arrangement (German Utility Model No. 74.38.451), foldable deflector means are provided in combination with a mower-conditioner, wherein the conditioner means comprise a pair of transverse rolls. The deflector means, when in the operative position, further consolidate the shape of the windrow which is discharged from the conditioner means. The deflector means may flip upwardly for transport purposes.

In another arrangement (German Application No. 22.31.624), foldable deflector means with transversely-adjustable deflector baffles are provided in combination with a mower-conditioner having a twin roll transversely-extending conditioner means. The baffles are adjustable in a transverse direction so as to be able to change the width of the windrow at will. When the windrow discharged from the conditioner means is not to be further consolidated, then the deflector means may be swung upwardly and placed on top of the machine, out of the path of the cut crop.

Other adjustable baffles for mower-conditioners are known, for example from the U.S. Pat. Nos. 3,208,206 and 3,383,844. Again these baffles are used merely further to consolidate the windrow already formed by the machine.

Haymaking machinery such as rake tedders conventionally have one or more deflector means rearwardly of each pair of rotors. When the deflector means are in the operative position, a windrow is formed. When the deflector means are flipped upwardly out of the path of the cut crop, the rotors spread the crop evenly in a wide pattern over the field.

SUMMARY OF THE INVENTION

It is the principal object of the present invention to overcome or to attenuate one or more of the aforementioned disadvantages of known mower-conditioners. More particularly, it is the object of the present invention to provide means on a mower-conditioner of the type disclosed in U.S. Pat. No. 4,094,132, whereby its versatility is increased.

According to the present invention a mower-conditioner comprises mower means for cutting standing crop, rotary crop conditioner and spreader means located rearwardly of the mower means for operating on the cut crop, fixed deflector means positioned rearwardly of the crop conditioner and spreader means and further deflector means movable between first and second positions relative to the fixed deflector means, the fixed and movable deflector means being operable in one position of the movable deflector means to form a windrow of the crop discharged from the crop conditioner and spreader means and in the other position of the movable deflector means to allow the crop conditioner and spreader means to widely spread the cut crop.

Preferably the fixed deflector means comprise a generally horizontal roof or top section and a generally vertical wall depending therefrom at the right-hand side thereof. The vertical wall may be inclined inwardly of the machine in a rearward direction and extends below the plane of the trajectory of the crop issuing from the conditioner and spreader means at a location rearwardly thereof. The movable deflector means preferably comprise a first deflector pivotally mounted for movement between an operative and an inoperative position. When in the operative position, the first deflector generally defines a left-hand, generally fore-and-aft extending generally vertical wall, relative to the roof or top section, and may be swung to the inoperative position in which it is disposed above the roof or top section. With the first deflector in the inoperative position, crop which is discharged from the conditioner and spreader means is spread in a fluffy manner over a wide area or pattern. With the first deflector in the operative position, it defines with the horizontal roof or top section an inverted U-shaped channel which preferably tapers rearwardly and has smooth inner surfaces.

One or more additional movable deflectors may be provided to the rear of the fixed and first deflectors to improve the shape of the windrow formed thereby and/or to provide shields for certain components of the machine.

The conditioner and spreader means and the deflector means may be provided on a single subframe in one arrangement. In another arrangement, the conditioner and spreader means may be mounted on the mower means and be movable together therewith with respect to a chassis supporting, amongst other components, the deflector means.

Preferably the mower means comprise cutter drums which are arranged in pairs with corresponding pairs of rotary conditioner and spreader units disposed behind respective pairs of drums. Each rotary unit may be rotatable about a generally upright axis and one rotary unit of each pair is preferably located closer to the mower means than the other rotary unit of the pair.

The rotary units of the conditioner and spreader means are each driven in the same direction as the associated cutter unit behind which it is mounted. Each rotary unit preferably comprises a generally upright, although slightly forwardly inclined, shaft having a plurality of conditioning and spreading tines secured thereto. The tines extend in a generally radially outwardly direction from the shaft although slightly inclined to, and trailing, a true radius relative to the direction of shaft rotation. The tines may be arranged in one or more layers in planes generally perpendicular to the associated rotor shaft. Preferably the paths of the outer ends of the tines of neighbouring rotary units overlap each other with the rotary units being driven in synchronism.

The left-hand rotary unit, looking from the rear of the machine, of each pair is arranged as close to possible to the rear of the associated cutter unit so that the rearmost portion of the latter is positioned generally underneath the rotary unit. The right-hand rotary unit of each pair is positioned slightly further rearwardly of the machine compared with the left-hand unit. Nevertheless, the path of the tines of the right-hand rotary unit still overlaps the path of the cutters of the associated cutter unit. As a result of this offset relationship of the rotary units of each pair, the plane of symmetry of the conditioner and spreader means is positioned at an angle with the plane of symmetry of the mower means. Thus the centre line of a pair of rotary units subtends an acute angle with the transverse direction of the machine.

The conditioner means may be detachably mounted on the mower means via quick attach coupling means. The mower means may comprise a rearwardly-extending arm with an upwardly and forwardly inclined, rearwardly-facing abutment surface, and a rounded upper edge. The conditioner and spreader means comprise an abutment surface arranged to contact the abutment surface on the mower means, and a mounting hook for hooking around the rounded upper edge on the aforesaid mounting arm. Fixation means are provided adjacent the lower edges of the abutment surfaces for holding both abutment surfaces tightly together and thus retaining the conditioner and spreader means on the mower means.

BRIEF DESCRIPTION OF THE DRAWINGS

Mower-conditioners according to the present invention will now be described in greater detail, by way of example, with reference to the accompanying drawings, in which.

DETAILED DESCRIPTION OF A PREFERRED EMBODIMENT

Figures 1, 2:
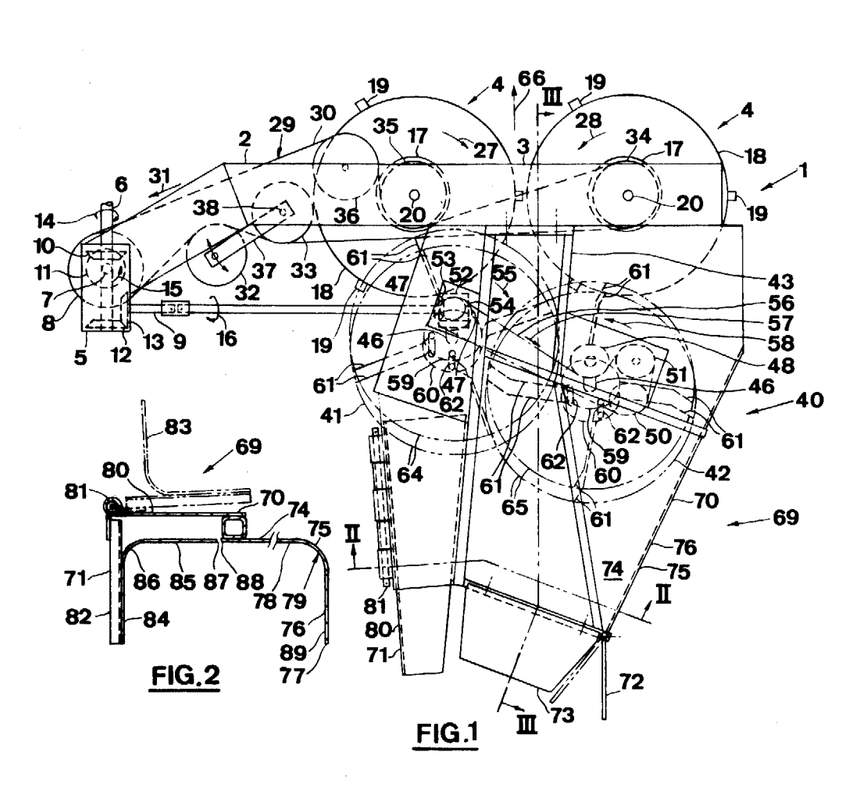
FIG. 1 is a schematic top view of one mower conditioner according to the invention.
FIG. 2 is a sectional view taken along the line II—II of FIG. 1.
Figure 3:
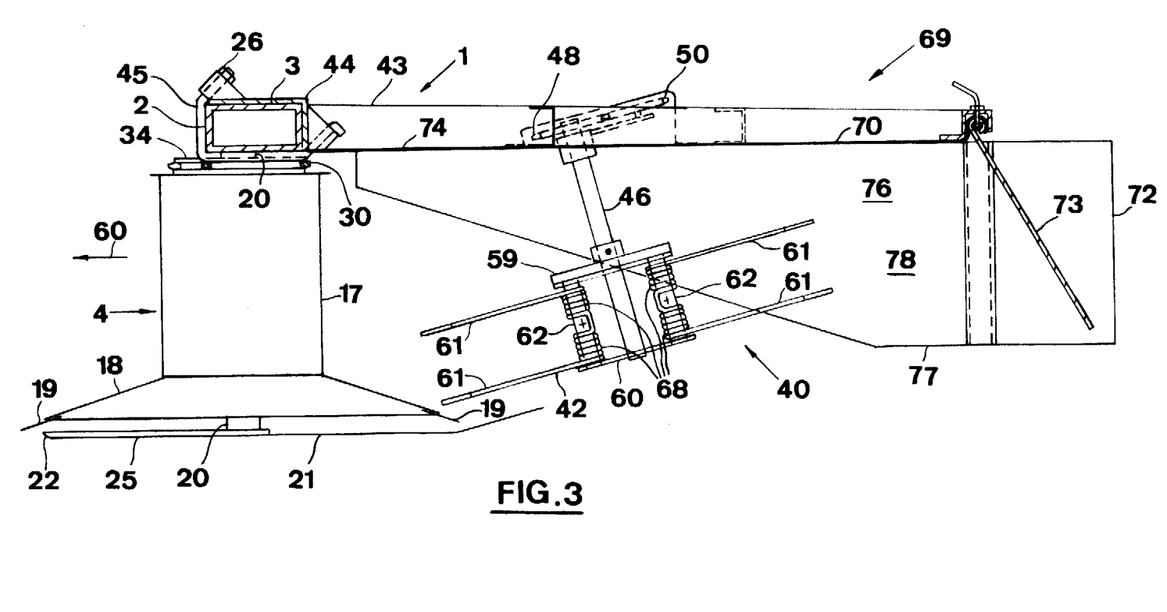
FIG. 3 is an enlarged sectional view taken along the line III—III of FIG. 1.

With reference to FIGS. 1 to 3, the mower-conditioner is of the tractor-mounted type and has a mower or cutter unit indicated generally at 1 and comprising a chassis 2 having a generally transversely-extending main and upper beam 3 with a pair of rotary drum type cutter units 4 depending therefrom. The transversely-extending main beam 3 is connected in a manner known per se to the three point-linkage of the tractor (not shown) by means of an appropriate subframe (also not shown). At its extreme left end, as seen in FIG. 1, the upper main beam 3 supports a gearbox 5 having a forwardly-facing input shaft 6 which is adapted to be coupled to the tractor PTO by means of a universal joint (not shown). The gearbox 5 further comprises a downwardly-extending output shaft 7, supporting a pulley 8, as well as a transverse output shaft 9. Motive power is transmitted from the input shaft 6 to the output shafts 7 and 9 via conical gears 10, 11 and 12, 13, respectively. The direction of movement of the input shaft 6 is indicated at 14 and the conical gears 10 to 13 are arranged so as to cause the output shafts 7 and 9 to rotate in the directions 15 and 16, respectively.

The two rotary cutter units 4 are of the drum type and each comprises a mower drum 17 having crop conveying members thereon (not shown) and having at the lower ends frusto-conical mower flanges 18 secured thereto. Each mower flange 18 supports at the outer periphery a plurality of cutter blades 19. Each drum 4 is rotatably supported on a downwardly-projecting stationary shaft 20 affixed to the underside of the main beam 3 and which at the other and lower end supports a stationary drum-support member or skid 21. Each skid 21 has an upwardly curved forward edge 22 which terminates at the outer periphery of the associated mower flange 18. The skids 21 are interconnected by links (not shown) disposed rearwardly of the rotary axes of the mower units and have generally flat central portions 25 arranged in use to support at least a portion of the total weight of the machine upon the ground.

The rotary drum cutter units 4 are driven in opposite directions, as shown at 27 and 28, by a belt drive transmission generally indicated at 29 which extends between the pulley 8 and the cutter units 4. The belt drive transmission 29 comprises a single belt 30 which, seen in the direction of rotation 31, extends around the pulley 8, forwardly around a first tension pulley 32, rearwardly around a second tension pulley 33, around a pulley 34 arranged coaxially with the right-hand cutter unit 4 (as seen in FIG. 1), rearwardly around a pulley 35 arranged coaxially with the other cutter unit 4, and finally, forwardly around a third tension pulley 36. The first tension pulley 32 is rotatably mounted on a springloaded pivot arm 37 which is arranged to pivot around a pivot shaft 38 and urged to move in a forward direction by a tension spring (not shown). The position of the second and third tension pulleys 33 and 36 may be made adjustable. However, during normal operation, the rotary axes thereof are fixedly supported on the main beam 3. The cutter paths of the cutter blades 19 on the respective drum 4 are arranged to overlap each other and in order to avoid interference between the sets of blades, the blades of one drum are staggered in height relative to the blades of the other drum, whereby the drums do not have to be driven in synchronism.

Crop conditioner and spreader means generally indicated at 40 are mounted rearwardly of the mower unit 1 and comprise a pair of rotary conditioner and spreader units 41 and 42. These rotary units 41, 42 are rotatably mounted in a subframe 43 which is fixed to the main upper beam 3 via an angled bracket 44, which is part of the subframe 43 and which hooks over the main beam 3, and a pair of angled brackets 45 which hook under the beam 3 and which are hooked at one end to the subframe 43 and bolted at the other end to the bracket 44 at 26. The conditioner and spreader units 41 and 42 comprise generally upwardly-directed but slightly forwardly inclined rotary shafts 46 which are rotatably mounted in the subframe 43 and support at their top ends drive sprockets 47 and 48, respectively. The forward inclination of the shafts 46 is preferably of the order of 20° relative to the vertical. The subframe 43 further supports a pair of tensioning and reversing sprockets 50 and 51, respectively. Concentrically with the left-hand shaft 46 and at the top end thereof a gearbox 52 is arranged on the subframe 43. Motive power is supplied from the gearbox 5 to the gearbox 52 via the transverse output shaft 9. Inside the gearbox 52 a pair of conical gears 53 and 54 is arranged to transmit the motive power from the transverse shaft 9 to the shaft 46 of the left-hand rotary unit 41 which is caused to rotate in the direction 55. A chain transmission 56 extending, when seen in the direction of movement 57 thereof, from around the sprocket 47, rearwardly around the sprocket 48 and then around the sprockets 51 and 50, is arranged to drive the right-hand rotary unit 42 in the direction 58 and in synchronism with the adjacent rotary unit 41.

Each shaft 46 supports at its lower end a pair of mounting flanges 59 and 60 for supporting conditioner and spreader tines 61. The mounting flanges 59, 60 extend perpendicularly to the shafts 46 and hence are inclined slightly upwardly to the rear by the same angle as the shafts 46 are inclined forwardly. The conditioner and spreader tines 61 are mounted on the flanges 59, 60 via mounting spindles 62 and extend outwardly within planes perpendicular to the longitudinal axes of the shafts 46. Preferably, the tines 61 are positioned in a slightly trailing position relative to radii of the shafts 46 and the mounting spindles 62.

As best seen in FIG. 1, both conditioner and spreader units 41 and 42 have substantially the same diameter. Also, while the left-hand unit 41 is positioned as close as possible to the rear side of the left-hand mower drum 17 and thus substantially covering the rearmost portion of the associated mower flange 18, the right-hand unit 42 is spaced further rearwardly of the associated right-hand mower drum 17. Nevertheless the path 65 of the outer ends of the tines 61 still overlap to some extent the cutter path of the cutters 19 of the right-hand drum 17.

As a result of the offset of one conditioner and spreader unit relative to the other, the centre line or line of symmetry of the units 41 and 42 subtends an acute angle with the transverse direction of the machine which angle is preferably of the order of 20°. The paths 64, 65 of the extreme ends of the tines of the rotary units 41, 42 also overlap each other to a substantial extent, hence the synchronised drive of these units.

As seen from FIG. 3, the tines 61 are of the spring type and comprise spring coils 68 extending around the mounting spindles 62.

The subframe 43 further also supports deflector means generally indicated at 69 and basically comprising a rigidly mounted deflector 70 and a number of movable deflectors 71, 72 and 73 pivotally attached thereto. The rigidly mounted deflector 70 comprises a generally flat and horizontal roof or top section 74 extending from adjacent the main beam 3 in a rearward direction over and beyond the conditioner and spreader units 41 and 42. At least the right-hand unit 42 is entirely shielded from above by the stationary roof 74, the latter having a right-hand side edge 75 which, as seen from front to rear, is inclined inwardly relative to the fore-and-aft plane of symmetry of the machine. A generally flat and vertical wall 76 depends from the inwardly inclined edge 75 and extends from a location generally alongside the right-hand unit to beyond the discharge end of the conditioner and spreader units 41–42. The vertical wall 76 is shorter at its forward end than at its rearward end. More important, however, is that the lower edge 77 of the vertical wall 76 extends below the plane of action of the conditioning and spreading tines 61 at the discharge end thereof, and at a location rearwardly thereof, so that the wall is in the path of crop material discharged from the units 41 and 42 towards the right-hand side. The stationary or rigidly mounted deflector 70 comprising the roof 74 and the vertical wall 76 extend substantially beyond the discharge end of the conditioner and spreader units 41 and 42. The roof 74 and the wall 76 comprise an inner smooth guide surface 78 devoid of any obstructions and with a smoothly curved transition 79 between the horizontal and vertical sections thereof as seen in FIG. 2.

The first movable deflector 71 is pivotally arranged around a generally fore-and-aft extending pivot axis 81 at the left-hand edge 80 of the stationary roof 74 for pivotal movement from a generally vertical position 82 extending downwardly from the roof to a non-operative position 83 on top of the roof, and vice versa. The movable deflector 71, when in the operative position, extends in a rearward direction from a location generally behind the left-hand side of the left-hand conditioner and spreader unit 41 to a point even further rearwardly than the stationary deflector 70. The movable deflector 71 comprises inner guide surfaces 84 and 85 defining an angle of 90° with respect to each other, the junction therebetween featuring a smooth curved surface 86 (FIG. 2). The upper horizontal surface 85, when the movable deflector 71 is in its lowered or operative position, is arranged in the same plane as the inner smooth surface 78 of the stationary deflector 70, the respective edges 87 and 88 being closely adjacent to each other. The stationary deflector 70, together with the movable deflector 71 when in its operative position, forms an inverted U-shaped channel which tapers in a rearward direction and which encompasses the discharge area of the conditioner and spreader units 41-42.

A further adjustable deflector 72 is pivotally arranged on the rear upright edge of the wall 76 and may be secured in any one of a range of angled positions with respect to the fore-and-aft axis of the machine. A third movable deflector 73 is pivotally attached to the rear of the roof 74 in a manner so that it can be secured in any one of a range of inclined positions relative to the horizontal.

OPERATION OF THE PREFERRED EMBODIMENT

In operation, the machine is driven in the field in the direction 66 (FIG. 1) and the cutter units 4 and the conditioner and spreader means 40 are driven in the directions 27, 28 and 55, 58, respectively, as described. Standing crop is cut by the cutter blades 19 and flung rearwardly through the discharge opening between the two drums 17, and above the flanges 18, by the action of the drums and flanges. The drums 17, and more particularly the crop-conveying means thereon, help positively to urge the cut crop in the rearward direction. During this rearward movement immediately after being released by the drums 17, the cut crop is intercepted by the conditioner and spreader tines 61 of the left-hand rotary unit 41, whereby a fluent and continuous transitional movement from the cutter means to the conditioning means is achieved as well as a continuous clearing of cut crop from the rear of the cutter means. Apart from this immediate interception of the cut crop after being released by the drums 17, the following characteristics of the machine also aid the fluent flow of cut crop from the cutter units to the conditioner and spreader units: the tines 61 are particularly aggressive in engaging the cut crop (more so than the known twin-roll conditioner means); when intercepting the cut crop which is moving in a generally rearward direction, the tines 61 also have a rearwardly-directed component of movement; due to the slightly upward inclination of the paths 64, 65 of the tines 61 at the location where the crop is first contacted thereby, the tines 61 have a so-called "combing" action on the crop.

Due to the slight upward inclination of the rearward adjacent sections of the paths 64, 65 of the tines 61, and to the slight offset of the right-hand rotary unit 42 relative to the left-hand rotary unit 41, the crop is deflected in upward direction as well as to the left. This aids the conditioning effect of the machine.

However, the conditioning effect is attributable in particular to the above mentioned combing action in combination with the relatively high rotary speed of the rotary units which in general, is in the range of 400 to 600 rpm (15 to 25 m/sec). This results in a considerable acceleration of the crop and a continuous cracking of the stems thereof, whereby, as explained above, moisture can evaporate more quickly therefrom.

The machine will in the main be used as a mower conditioner and a spreader. Therefore, the movable deflector 71 will be swung to its inoperative position 83 on top of the stationary portion 70. In addition, the deflector 72 will be in the general fore-and-aft position as shown in FIG. 1, whilst the deflector 73 may be in an almost horizontal position. In other words both deflectors 72 and 73 are in the inoperative position.

With the machine adjusted as described above, and after having been submitted to the conditioning action, the crop is discharged in a slightly upward direction and slightly to the left of the operative direction of movement of the machine, whereafter the conditioned crop is deposited on the ground in a fluffy and very even and widespread pattern or windrow, ready for immediate, fast drying. Depending, inter alia, on the drive speed of the conditioner and spreader units 41 and 42, the crop will be spread over a width which is two to four times the width of the width of the machine. This ideal pattern is obtained by the above described arrangement of the conditioner and spreader units 41, 42 and more particularly by the "combing" action of the tines 61 thereof as well as by the slightly upward inclination of the working paths 64, 65 of the tines 61 and by the slightly rearward offset of the right-hand rotary unit 42 relative to the left-hand rotary unit 41.

The discharge and the spreading of the crop to the left of the operative direction of movement of the machine is particularly advantageous insofar as no cut and conditioned crop is thrown onto the standing crop and a path which is clear of crop is provided for the right-hand tractor wheels to run along during the next run. This is obtained by the action of the wall 76 which deflects to the left any crop material which otherwise would be deposited too far to the right.

When starting a havesting operation, the sidewards delivery of the crop by the conditioner and spreader means (when operative) may cause problems insofar as the crop may be thrown off the field into a neighbouring field or ditch, for example. Under these circumstances the movable deflector 71 is swung to its lowermost position so that it deflects the crop which is discharged from the conditioner and spreader units 41 and 42 into a windrow generally rearwardly of the machine. As soon as a few runs (for example three) have been completed and the aforementioned risks no longer exist, the movable deflector 71 may be swung again to its inoperative position 83.

In those cases where relatively compact windrows are preferred, as opposed to evenly and widely spread crop (e.g. in case mown crop is to be chopped within 24 or 48 hours in a forage harvester), the movable deflector 71 is placed in its vertical and operative position 82 as seen in FIG. 2. In this position the crop is discharged by the conditioner and spreader units 41 and 42 into the channel defined by the smooth vertical, horizontal and curved guide surfaces 84 and 89; 85 and 78; 86; and 79. These guide surfaces smoothly and fluently consolidate the crop into a relatively narrow windrow and deposit it as such on the ground rearwardly of the machine. The smooth and fluent discharge of the crop into a windrow is due particularly to the fact that frame members and other components which could obstruct the fluent flow, are provided outside the aforementioned channel.

The deflectors 72 and 73 are useful for further consolidating and shaping the windrow. The upper deflector 73 is adjusted to have a steep downward inclination relative to the horizontal and the deflector 72 is adjusted at a greater angle to the forward direction of operative travel.

It will be apparent that a machine according to the invention has many advantages over existing machines. First of all, a more versatile machine is provided with which it is possible on the one hand to cut, condition and evenly spread crop and yet on the other hand, to adjust the machine in a simple manner so that relatively narrow windrows may be formed when desired. A major advantage is that three functions in the process of haymaking are satisfactorily combined in a single machine, these functions being cutting or mowing, conditioning, and spreading the crop in an even, fluffy manner ready for quick drying. This means that a machine according to the invention is labour saving as at least one further operation with an independent tedder can be avoided. Moreover, the mown and conditioned crop is fully exposed to the drying influence of the sun and the wind immediately after being mown and conditioned, so that the benefit of having conditioned the crop is immediately realised.

The integration of the cutting, conditioning, spreading and windrowing functions into a single piece of equipment instead of being either a combination of two or more independent machines towed one behind the other, or two or more independent machines used at spaced apart time intervals for accomplishing the various operations, in an unvarying relationship between the mower means and the conditioner means even when ground irregularities are encountered so that optimum machine efficiency is always maintained. Moreover, the conditioner and spreader tines cannot touch the ground surface so that breakdowns are reduced and the mixing of soil with the crop is eliminated or kept to a minimum.

Finally, it has been experienced that with a mower-conditioner according to the invention, the butt ends of the crop stems are more often laid on top of the windrow than has ever been the case in known machines. This is again advantageous for speeding up the drying cycle.

MODIFICATIONS

Figure 5:
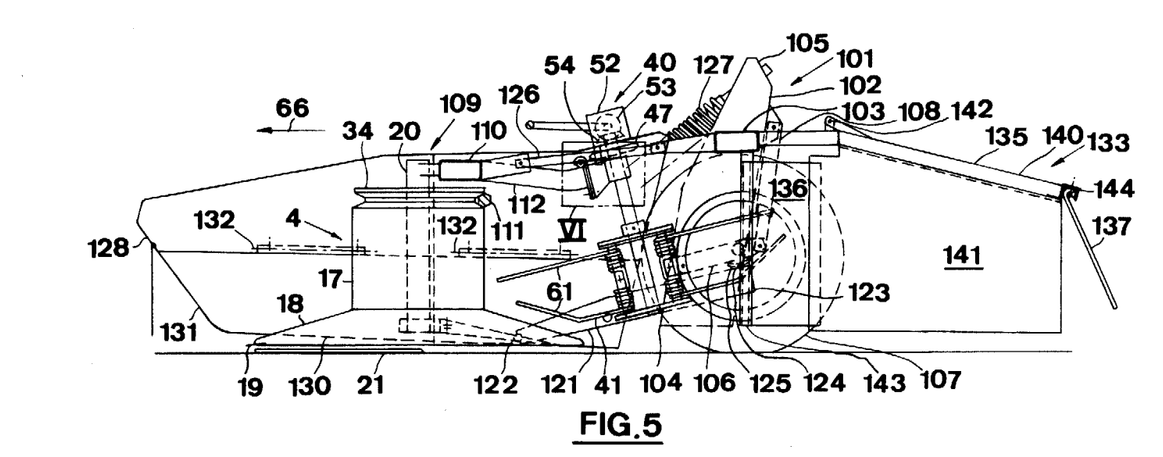
FIG. 5 is a sectional view taken along the line V—V of FIG. 4.
Figure 6:
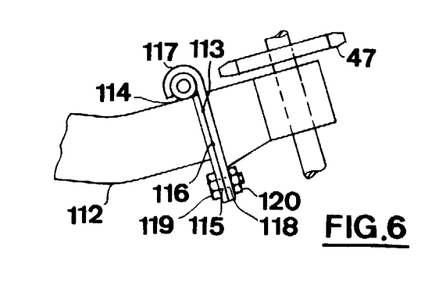
FIG. 6 is a view to a larger scale of the portion indicated at VI in FIG. 5.

It will be appreciated that many alternative embodiments of the invention are possible; with reference to the FIGS. 4 to 6 one such embodiment will be described. In these figures, the same reference numerals are used for the components similar to those already described.

The mower-conditioner is of the pull type, is generally indicated at 101, and comprises a mobile frame 102 with a main transverse beam 103 and depending legs 104 at opposite ends thereof. The legs 104 have respective extensions 105 which project above the transverse beam 103 and pivotally support adjacent their lower ends rearwardly-extending pivotal arms 106, each of which arms in turn rotatably supports at its rearward end a ground-engaging wheel 107. A pair of hydraulic cylinders 108 pivotally interconnect and extend between the extensions 105 and the rearmost ends of the arms 106.

The upper main beam 103 pivotally supports intermediate its ends the rear end of a forwardly-projecting arched drawbar (not shown) which is arranged at its other end for coupling the machine to a pulling tractor or the like (also not shown).

A header in the form of a mover unit is generally indicated at 109 and comprises a sub-frame 110 which supports the cutter units 4 in a rotatable fashion. The cutter units 4 comprise the mower drums 17 as before having respective pulleys 34 and 35 at their upper ends for receiving motive power from the gearbox 5 through a belt drive which is generally indicated at 111. The gearbox 5, which is mounted on the subframe 110, receives motive power from the tractor PTO through the universal joint shaft 6.

The conditioner and spreader means 40 are similar to the conditioner and spreader means described above in connection with the first embodiment of the present invention and, therefore, the description thereof will not be repeated here.

However, the mounting of the conditioner and spreader means 40 is different and will now be described. The conditioner and spreader means 40 are mounted on the mower unit 109 and to this end the subframe 110 comprises a rearwardly-projecting arm 112 having an upwardly and forwardly inclined, rearwardly facing, mounting surface 113 with a rounded upper edge 114 and a number of fixation apertures 115 adjacent the lower edge. The subframe 43 of the conditioner and spreader means 40 comprises a mounting surface 116 facing forwardly with an upper mounting hook 117 and a number of fixation apertures 118. When mounting the conditioner and spreader means 40 on the header 109, the hook 117 is positioned over the rounded edge 114 in a manner so that the mounting surfaces 113 and 116 abut and the fixation apertures 115 and 118 are aligned with each other. The mounting surfaces 113 and 116 are then bolted together at 120. This provides a "quick-attach" mounting for the conditioner and spreader means 40 on the mower unit 109.

The suspension of the mower unit 109 and the conditioner and spreader means 40 on the mobile frame 102 will now be described in greater detail. The downwardly extending legs 104 pivotally support at their lower ends and below the pivotal mountings of the arms 106 a pair of mounting links 121. These links 121 are pivotally coupled at their forward ends to a lower portion of the subframe 110 via ball joints 122 and have rearwardly-projecting extensions 123 extending below the arms 106 and having contact surfaces 124 for contacting the reinforced and curved under surfaces 125 of the arms 106.

A single upper link 126 interconnects the upper beam 103 of the mobile frame 102 and an upper portion of the subframe 110. Springs 127 interconnect a lower portion of the subframe 110 and the extensions 105 of the main frame 102 for resiliently supporting the mower unit 109, with the conditioner and spreader means thereon, in the operative position.

The mower unit 109 comprises a pair of safety shields 128 at opposed sides to prevent people accidentally putting their feet in the path of the cutter blades 19. These safety shields 128 have to this end lower edges 130 which are positioned closely above the level of the cutter paths and outwardly of the outermost points of the cutter paths. Whilst these shields 128 are needed in the interests of safety, they may cause jamming. This is especially so when finishing a field because during the last run less than a full size swath is often cut. In these circumstances, one of the shields 128, most often the right-hand shield, may move over crop which has already been cut during a previous run. To overcome this problem, the lower portion 131 of each shield 128 is made pivotable about a horizontal pivot shaft 132 so that when jamming is likely to occur, the lower portion 131 may be pivoted to a raised position.

The deflector means in the present embodiment of the invention are generally indicated at 133 and are attached to the mobile frame 102 at a location generally rearwardly of the conditioner and spreader means 40 for encompassing the discharge area thereof. As the deflector means 133 are mounted on the mobile frame 102 and as the conditioner and spreader means 40 are mounted on the mower unit 109, which may float with respect to the mobile frame 102, it is also clear that the conditioner and spreader means 40 are movable vertically with respect to the deflector means 133. Yet the deflector means 133 encompass the discharge area of the conditioner and spreader means in all situations.

The deflector means 133 again comprise a fixed deflector 134 and movable deflectors 135, 136, 137. The fixed deflector 134 comprises a generally horizontal roof or top section 138 with a general vertical wall 139 depending therefrom at the right-hand side thereof. The wall 139 defines an angle with respect to the direction of operative travel. The movable deflector 135 also comprises, as seen when in the lowered position of FIG. 5, a generally horizontal roof or top section 140 and a vertical wall 141 depending therefrom at the left-hand side. The wall 141 is angled with respect to the direction of operative travel and, together with the wall 139, defines a rearwardly-tapering passage. The movable deflector 135 is pivotably mounted around a horizontal and transversely-extending pivot shaft 142 and may be pivoted thereabout to an inoperative position on top of the roof 138 and the mobile frame 102.

The movable deflector 136 is pivotable about a vertical pivot shaft 143 and is arranged to shield the left-hand wheel 107 in all circumstances. The movable deflector 137 is pivotably mounted on the rear edge of the roof 140 of the main movable deflector 135 via a pivot shaft 144.

OPERATION OF MODIFIED EMBODIMENT

For operation in the field, the mower unit 109 is lowered to the operative position and the various components are driven, with the machine moved in the direction of operative travel 66. As before, standing crop is cut by impact and flung towards the conditioner and spreader means 40 which, after having conditioned the crop, evenly spread it in a wide pattern over the field when the movable deflector 135 is swung to its inoperative position. In this case, the deflector 136 is swung to its outermost position adjacent the left wheel 107 for shielding this wheel and thus preventing crop material being thrown thereagainst. As in the first embodiment, the vertical wall 139 is operative to intercept crop material flung in the direction of the standing crop and to deflect the same to a degree such that no cut crop reaches the standing crop and such that a path sufficient for the passage of the right-hand tractor wheels during the next run is left free of any cut crop.

Figure 4:
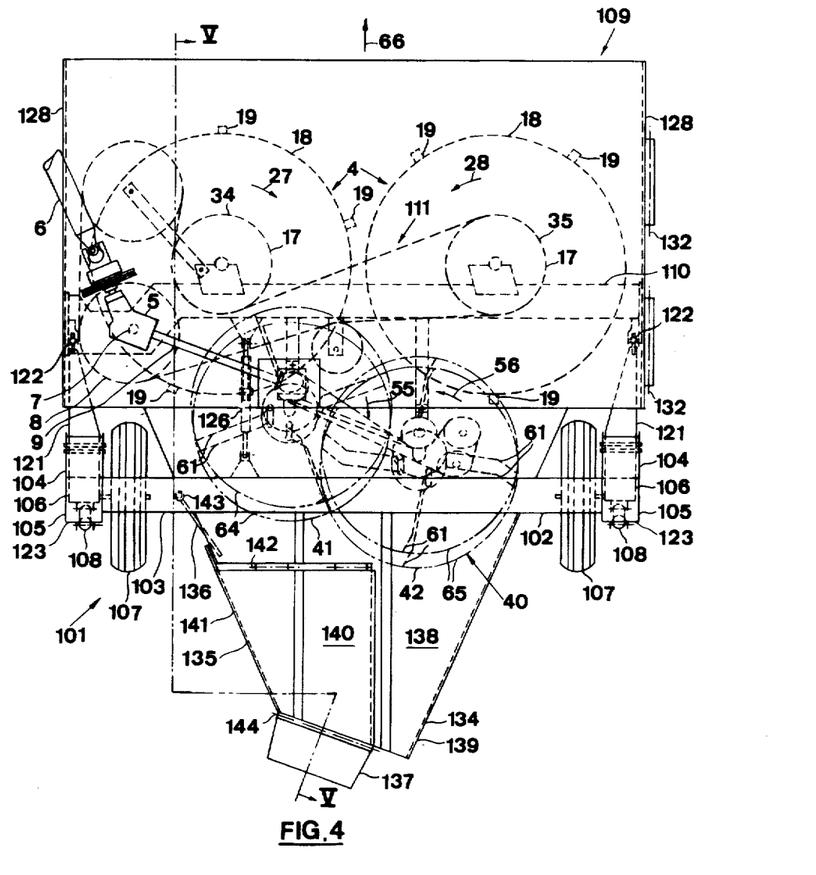
FIG. 4 is a schematic top view of an alternative mower-conditioner according to the invention.

When a relatively compact windrow is preferred, the deflector 136 is pivoted inwardly to the position shown in FIG. 4. In addition, the movable deflector 135 is pivoted to its operative position to define with the fixed deflector 134 an inverted U-shaped, and rearwardly-tapering, channel encompassing the discharge area of the conditioner and spreader means 40. Crop material discharged from the conditioner and spreader means 40 is thereby deflected and confined into a relatively narrow and well shaped windrow rearwardly of the machine. The additional deflector 137 is useful for compressing and shaping the windrow as it is being formed.

Having thus described the invention, what is claimed is:

1. A mower-conditioner comprising:
   mower means for cutting standing crop,
   rotary crop conditioner and spreader means located rearwardly of the mower means for operating on the cut crop,
   fixed deflector means positioned rearwardly of the crop conditioner and spreader means and
   further deflector means movable between first and second positions relative to the fixed deflector means, the fixed and movable deflector means being operable in one position of the movable deflector means to form a windrow of the crop discharged from the crop conditioner and spreader means and in the other position of the movable deflector means to allow the crop conditioner and spreader means to widely spread the cut crop.

2. A mower-conditioner according to claim 1, wherein the fixed deflector means comprise a generally horizontal roof and a generally upright wall depending therefrom at the side thereof which, in use, usually is positioned next to the still uncut crop.

3. A mower-conditioner according to claim 2, wherein the generally upright wall is inclined inwardly of the machine in a rearward direction and extends below the plane of trajectory of crop issuing from the conditioner and spreader means at a location rearwardly thereof.

4. A mower-conditioner according to claim 3, wherein the movable deflector means comprise a first deflector pivotally mounted for movement between an operative and an inoperative position, the first deflector defining a generally upright wall relative to the roof at the side of the machine which in use, usually is positioned remote from the still uncut crop, in the operative position and being pivotable to the inoperative position in which it is retracted from the trajectory of crop issuing from the conditioner and spreader means.

5. A mower-conditioner according to claim 4, wherein the first deflector, when in its operative position, together with the roof and the generally upright wall of the fixed deflector means define an inverted U-shaped channel which tapers rearwardly and has smooth internal surfaces.

6. A mower-conditioner according to claim 4, wherein the first deflector also comprises a portion which, in the operative position of the first deflector, extends horizontally and complements the roof of the fixed deflector means.

7. A mower-conditioner according to claim 4 wherein the movable deflector means further also comprise a second deflector pivotally attached to the rear edge of the roof and securable in any desired position inclined to the horizontal.

8. A mower-conditioner according to claim 4 wherein the movable deflector means also comprise a third deflector pivotally attached to the rear edge of the generally upright wall of the fixed deflector means and securable in any desired position relative to the fore-and-aft axis of the machine.

9. A mower-conditioner according to claim 6, wherein the movable deflector means further also comprise a fourth deflector pivotally attached to the rear edge of the portion of the first deflector, which, when in the operative position, extends generally horizontally; the fourth deflector being movable between an operative position in which it extends generally downwards and an inoperative position in which it is retracted from the trajection of crop issuing from the conditioner and spreader means at a location rearwardly thereof.

10. A mower-conditioner according to claim 4 wherein the machine comprises ground-engaging wheels rearwardly of the mower means and wherein the movable deflector means further comprise a fifth deflector pivotally mounted about a generally vertical axis and movable between a first position in which it shields one of the wheels from cut crop issuing from the conditioner and spreader means, and a further position in which it helps forming a windrow.

11. A mower-conditioner according to claim 1 wherein the mower means comprise a safety shield extending generally vertical adjacent one side, the shield having an upper portion and a lower portion with the lower portion pivotally attached to the upper portion and movable with respect thereto between an operative position in which it extends downwardly from the upper portion to shield the mower means, and a raised position.

12. A mower-conditioner comprising:
at least one pair of side-by-side extending rotary mower means rotatable in opposite directions about generally upright axes for cutting standing crop and conveying cut crop rearwardly,
a pair of rotary crop conditioner and spreader means located rearwardly of an cooperable with the or each pair of rotary mower means and rotatable in opposite directions about generally upright axes for receiving cut crop from the mower means, for operating on the cut crop and for discharging said crop rearwardly thereof along a generally rearwardly directed trajectory,
fixed deflector means rearwardly of the crop conditioner and spreader means and substantially at one side of the rearwardly directed trajectory, and
further deflector means movable between first and second positions relative to the fixed deflector means; the fixed and movable deflector means being operable in one position of the movable deflector means to confine crop discharged from the conditioner and spreader means and to form a windrow thereof, and in the other position of the movable deflector means to allow the crop conditioner and spreader means to widely spread the cut crop.

13. A mower-conditioner according to claim 12 wherein the mower means are of the drum type comprising a pair of oppositely rotated drums supporting at their lower ends flanges each of which supports at least one cutter blade at its outer periphery.

14. A mower-conditioner according to claim 13 wherein the conditioner and spreader means are rotatable about generally upright, although slightly forwardly inclined axes and comprise shafts, each of which is supporting a plurality of conditioning and spreading tines which extend generally outwardly therefrom in planes generally perpendicular to the associated shaft.

15. A mower-conditioner according to claim 14 wherein one conditioner and spreader means of the or each pair of conditioner and spreader means is located further rearwardly of the mower means than the other conditioner and spreader means of said pair of conditioner and spreader means and wherein the fixed deflector means are located adjacent to and rearwardly of said one conditioner and spreader means.

16. A mower-conditioner according to claim 15 wherein the fixed deflector means comprise a generally horizontal roof substantially overlying the generally rearwardly directed trajectory and a generally upright wall depending therefrom at the side thereof which, in use, usually is positioned next to the still uncut crop.

17. A mower-conditioner according to claim 16 wherein the generally upright wall is inclined inwardly of the machine in a rearward direction and extends below the plane of trajectory of crop issuing from the conditioner and spreader means at a location rearwardly thereof.

18. A mower-conditioner according to claim 16 wherein the movable deflector means are pivotally mounted for movement between an operative and an inoperative position; the deflector means defining a generally upright wall relative to the roof at the side of the machine which in use, usually is positioned remote from the still uncut crop, when in the operative position and being pivotable to the inoperative position in which said movable deflector means are retracted from the trajectory of crop issuing from the conditioner and spreader means.

19. A mower-conditioner according to claim 18 wherein the movable deflector means, when in the operative position together with the roof and the generally upright wall of the fixed deflector means define an inverted U-shaped channel which tapers rearwardly and has smooth internal surfaces.

20. A mower-conditioner according to claim 18 wherein the movable deflector means also comprise a portion which, in the operative position of said movable deflector means extends horizontally and complements the roof of the fixed deflector means.

* * * * *